Patented Jan. 13, 1925.

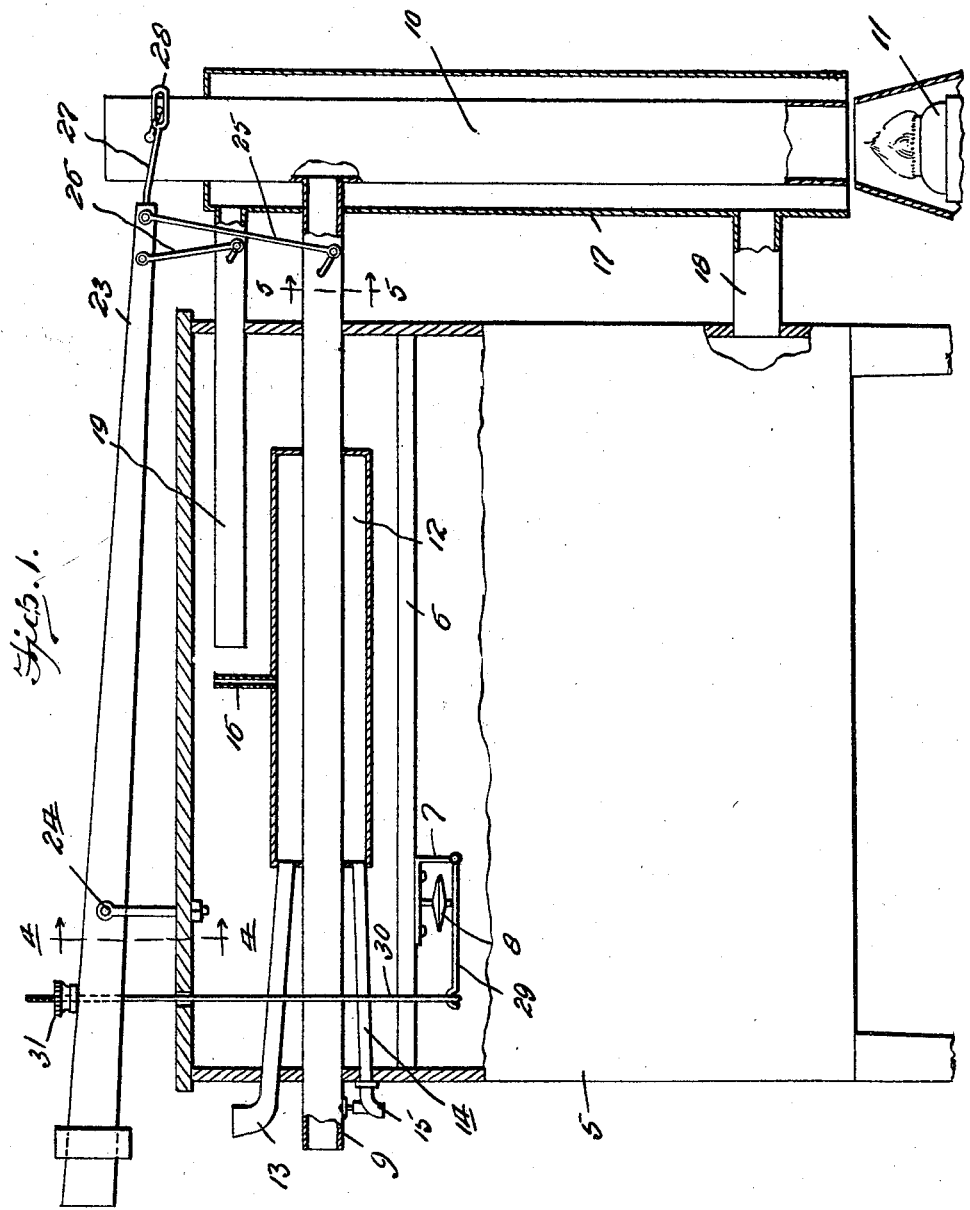

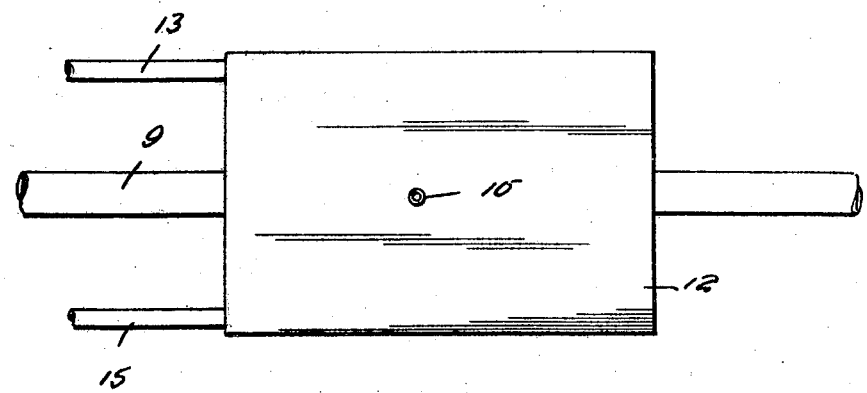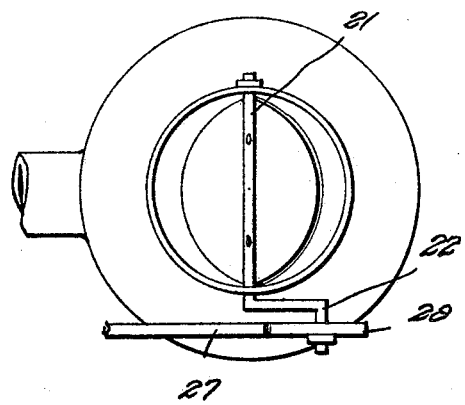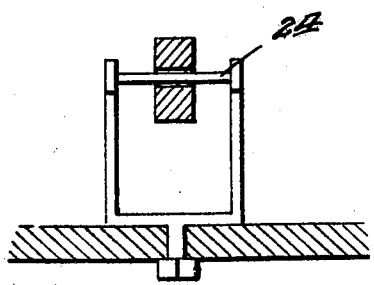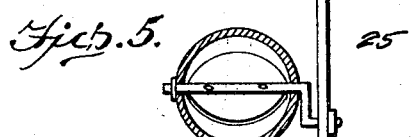

1,522,970

UNITED STATES PATENT OFFICE.

HENRY A. MURRY, OF MUSKOGEE, OKLAHOMA.

INCUBATOR.

Application filed September 18, 1923. Serial No. 663,325.

*To all whom it may concern:*

Be it known that I, HENRY A. MURRY, a citizen of the United States, residing at Muskogee, in the county of Muskogee and State of Oklahoma, have invented certain new and useful Improvements in Incubators, of which the following is a specification.

My invention relates to an improvement in incubators, and has for its primary object, the provision of such an incubator wherein moistened heated air supplied in a novel and simple manner is provided.

A further object of the invention is to provide an incubator wherein the degree of heat therein may be automatically regulated.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevation, partly in cross section of my improved incubator.

Figure 2 is a plan view of the water tank per se.

Figure 3 is an enlarged detail top plan of the heat conveying pipe and drum of the incubator, and Figures 4 and 5 are detail cross sections upon the lines 4—4 and 5—5 of Figure 1, and looking in the general direction of the arrows.

Having particular reference to the drawings, my novel incubator comprises a cabinet 5 of conventional form provided internally and adjacent its upper end with a longitudinally extending bar 6, upon which is a downwardly extending bracket 7 that carries a desirable form of thermostat 8.

Extending longitudinally within the cabinet 5 is a heat conveying pipe 9 that projects through openings in the front and rear walls of the cabinet. The rear end of this pipe has communication with a vertical pipe 10 that is positioned directly above a source of heat 11.

The said heat conveying pipe 9 extends through a water receptacle 12 within the cabinet 5, that is provided with a filler pipe 13, the outer end of which projects through an opening in the adjacent wall of the incubator cabinet, and is flared as shown in Figure 1. At the bottom side of said tank 12, there is provided a drain pipe 14, that also extends outwardly through an opening in the similar wall of the incubator cabinet, and is equipped with a faucet 15. The tank 12 is further provided with a steam outlet tube 16, it being of course apparent that the heat of the pipe 9 will heat the water within the tank 12 for producing steam, which will pass out through the tube 16, and consequently heat the interior of the incubator cabinet 5.

Surrounding the vertical heat pipe 10 is a drum 17, which communicates adjacent its lower end with the interior of the cabinet 5, through the medium of a pipe 18, it being noted in this connection, that said drum 10 is provided with an opening for the passage of the heat carrying pipe 9.

Formed upon the upper end of said drum 17 and extending inwardly through an opening in the incubator cabinet 5 is a pipe 19 for projecting into the cabinet a supply of unmoistened heated air, it being obvious that the inner end of this pipe has communication with said drum 17.

The pipes 9, 10, and 19 are each equipped with butter-fly valves of the type shown in Figures 3 and 4. These butter-fly valves are carried by cross rods 20 that extend through openings in opposite sides of the pipes. Certain ends of these cross rods are cranked as at 22, the crank portion of the rod and the pipe 9 being connected to a lever 23, pivoted at 24 to the top wall of the incubator, through the medium of a link rod 25. The said cranked end of the rod in the pipe 19 is similarly connected to the adjacent end of the lever 23 by a link rod 26. Upon this end of the lever 23 is a rod 28 formed at its free end with a slotted plate 28, through which projects the end of the cross rod 21 in the pipe 10.

The lever 23 is pivoted to the cabinet 5 at a point adjacent its opposite end, whereby the lever will be so balanced as to normally maintain the position shown in Figure 1 for opening the valves in the pipes 9 and 19 and closing the valve in the pipe 10.

Pivoted at one end to the said thermostat carrying bracket 7 within the cabinet is a rod 29 that has contact with the thermostat, and is adapted to be swung downwardly thereby, during expansion of the thermostat. Loosely connected to the opposite end of this lever 29 is an upwardly extending rod 30 that has free movement through an opening in the top wall of the cabinet as well as a cross slot in the lever 23.

The upper end of this rod 30 is screw threaded for receiving a thumb nut 31, whereby the lever 23 may be adjusted for obvious purposes.

The operation and advantages of an incubator of this type will be readily appreciated by those skilled in the art, and although I have herein shown and described the most practical embodiment of the invention with which I am at present familiar, it is nevertheless to be understood that minor changes may be made therein, without departing from the spirit and scope of the invention as claimed.

Having thus described my invention, what I claim as new, and desire to secure by Letters-Patent, is:

In an incubator, a cabinet, a water tank therein, a vapor outlet therefor, a heat pipe extending longitudinally through said water tank and said cabinet, inner and outer vertical heat pipes the inner one of which communicates with one end of said aforementioned heat pipe for supplying heat thereto, an additional longitudinal heat pipe extending from the outer one of said vertical pipes into said cabinet, a valve in the upper end of said vertical pipe being normally closed, a valve in each of the longitudinal pipes adjacent to said vertical pipe, said last mentioned valves being normally opened, a cross beam pivotally supported adjacent its lower end on said cabinet, the forward end of said beam having connection with each of said valves, and a thermostat mounted in said cabinet and connected to the rear end of said cross beam for automatically causing the operation of said cross beam whereby the valve in the vertical pipe will be opened, and the valves in the longitudinal pipes will be closed preventing the heat from the vertical pipes from entering into the longitudinal heat pipes.

In testimony whereof I affix my signature.

HENRY A. MURRY.